United States Patent
Fukui et al.

(10) Patent No.: US 6,826,927 B2
(45) Date of Patent: Dec. 7, 2004

(54) SYNTHETIC QUARTZ POWDER, ITS PRODUCTION PROCESS, AND SYNTHETIC QUARTZ CRUCIBLE

(75) Inventors: Masanori Fukui, Akita (JP); Takahiro Sato, Akita (JP)

(73) Assignee: Mitsubishi Materials Quartz Corporation, Tokyo (JP)

( * ) Notice: Subject to any disclaimer, the term of this patent is extended or adjusted under 35 U.S.C. 154(b) by 184 days.

(21) Appl. No.: 09/892,865

(22) Filed: Jun. 28, 2001

(65) Prior Publication Data

US 2002/0017114 A1 Feb. 14, 2002

(30) Foreign Application Priority Data

Jun. 28, 2000 (JP) ........................................ 2000-195167

(51) Int. Cl.[7] ................................................. C03B 1/00
(52) U.S. Cl. ........................... 65/17.2; 501/12; 264/321
(58) Field of Search ............................... 501/12; 65/385, 65/17.2, 395, 396; 264/321

(56) References Cited

U.S. PATENT DOCUMENTS

| | | | | |
|---|---|---|---|---|
| 4,301,034 A | * | 11/1981 | McDaniel | 502/236 |
| 4,680,045 A | * | 7/1987 | Osafune et al. | 65/396 |
| 4,680,046 A | * | 7/1987 | Matsuo et al. | 65/395 |
| 5,145,510 A | * | 9/1992 | Saito et al. | 65/17.2 |
| 5,211,733 A | * | 5/1993 | Fukao et al. | 65/395 |
| 5,279,633 A | * | 1/1994 | Fleming | 65/395 |
| 5,302,556 A | | 4/1994 | Shimizu et al. | |
| 6,071,838 A | * | 6/2000 | Endo et al. | 501/12 |
| 6,110,852 A | * | 8/2000 | Katsuro et al. | 501/54 |

FOREIGN PATENT DOCUMENTS

| | | |
|---|---|---|
| EP | 0 486 004 | 5/1992 |
| EP | 0 801 026 | 10/1997 |
| EP | 0 965 663 | 12/1999 |
| JP | 03 005329 | 1/1991 |

OTHER PUBLICATIONS

Chemcial Engineers' Handbook, Robert H. Perry, McGraw–Hill Boook Company, New York, Fifth Edition, 1973, pp. 6–32 and 6–33.*

* cited by examiner

*Primary Examiner*—John Hoffmann
(74) *Attorney, Agent, or Firm*—Oblon, Spivak, McClelland, Maier & Neustadt, P.C.

(57) ABSTRACT

The amount of residual carbon and hydroxyl groups in a synthetic quartz powder made by a wet process is reduced by baking the synthetic quartz powder in a low pressure atmosphere. Quartz glass crucibles made using the synthetic quartz powder have low bubble contents, and are particularly suited for growing single crystals.

6 Claims, No Drawings

SYNTHETIC QUARTZ POWDER, ITS PRODUCTION PROCESS, AND SYNTHETIC QUARTZ CRUCIBLE

BACKGROUND OF THE INVENTION

1. Field of the Invention

This invention relates to a synthetic quartz powder having few residual gases and a low carbon and hydroxyl group content, its production process, and a quartz crucible having a low bubble content, which is made with the synthetic quartz powder.

2. Discussion of the Background

A sol-gel process is known in which synthetic quartz powder is made by drying and baking a gel obtained by hydrolyzing a metal alkoxide. In this process an ethyl-silicate is hydrolyzed to be gelled ($nSi(OH)_4$), the gelled ethyl-silicate is pulverized and dried to obtain a silica gel powder, and the silica-gel powder is baked at a predetermined temperature (about 1050° C.) and dehydrated to obtain an amorphous silica powder ($nSiO_2$).

It is also known that the synthetic quartz powder made by this process is of high purity, having fewer metal impurities than a natural quartz powder, but that carbon and the hydroxyl group causing the alkoxy group remain. From this reason, when a quartz glass crucible is made by using the synthetic quartz powder obtained by the sol-gel method as a raw material, the carbon may cause bubbles to form.

Therefore, in the process for producing the synthetic quartz powder by the sol-gel method, a trial is done in which residual carbon is combusted and removed before the synthetic quartz powder is made by baking a dry gel powder. Processes are well known in which the amount of residual carbon is reduced by heat-treating the dry gel powder, where the carbon is changed to carbon gases by combustion at a temperature of less than 600° C., at which pores of the dry gel powder are not closed, in an oxygen atmosphere (generally in air). (Japanese Patent Laid Open No. Hei 09-86916 and Japanese Patent Application No. Hei 10-287416, etc.) In all of the processes, the residual carbon in the dry gel powder is combusted and removed before the pores of dry gel powder are closed. That is, an amorphous synthetic quartz powder is made by baking the dry gel powder at about 1000° C. to 1300° C., where the dry gel powder is vitrified (closing pores), after decarbonizing at less than 600° C.

Moreover, it is also known that the process, in which the amorphous synthetic quartz powder is made by pulverizing a quartz glass ingot, which is made by baking the silica powder made by the sol-gel method after heat-treating. (Japanese Patent Publication of Examined Application No. Hei 05-63416) The process removes an OH group by fusing the silica powder made by the sol-gel method, which is heated at 1500° C. after combusting organic materials at about 500° C. in air. Moreover, the process is common in the former process, wherein the residual carbon is combusted to be removed, by heating in air at a temperature of less than 600° C., at which the pores of dry gel powder are not closed. In addition, in the process, the heating is done in a low pressure atmosphere at time of making the glass ingot at about 1500° C. for evacuation removal of the air contained in the silica powder, and the removal of the residual carbon is mainly done in the oxidization combusting process before vitrifying at less than 600° C. In the high temperature sintering at about 1500° C., it is difficult to remove the carbon since the silica powder is sintered.

Furthermore, a process is also known (Japanese Patent Registration No.2530225) in which a predetermined high-density synthetic quartz powder is made by baking in two stages under a dry atmosphere or a reduced pressure, where the synthetic quartz powder is made by baking dry gel powder. Although the process shows baking under a reduced pressure as one mode of the baking process, since the process has the objective of increasing the effect of dehydration and the vacuum degree is low, the process is almost ineffective for decarbonization. That is, since this baking process heats with stirring while avoiding heating in the reduced pressure container, it is difficult to keep high vacuum and the limit of the reduced pressure is about 0.5 atmosphere in a real operation. Therefore, the residual carbon cannot be removed at such a reduced pressure.

About the synthetic silica powder made by the sol-gel process in this way, although it is conventionally known that the process, in which the residual carbon contained in silica powder is combusted in air to be removed, the limit of concentration of the residual carbon in the silica powder by said process is about 5 to 100 ppm, and it is difficult to reduce the residual carbon to less than this value.

SUMMARY OF THE INVENTION

The present invention solves the above-mentioned problems, and provides a treatment process that reduces the residual gases of the synthetic quartz powder made by a wet process, especially the amount of the residual carbon and the hydroxyl group content. Moreover, the present invention provides a synthetic quartz powder made by the treatment process, and a quartz glass crucible having few bubbles contents made by the synthetic quartz powder.

That is, this invention relates to a process for producing of synthetic quartz powder in the following embodiments.

(1) A process for producing of a synthetic quartz powder, wherein a silica gel powder or a synthetic quartz powder made by wet process is baked under a low pressure atmosphere of less than 100 Pa and at a temperature being from more than decarbonizing to less than powder sintering.

(2) A process for producing of a synthetic quartz powder, wherein a silica gel powder made by wet process is baked to be a synthetic quartz powder under an air atmosphere and at a temperature from more than removing a hydroxyl group to less than powder sintering, and the synthetic quartz powder is baked under a low pressure of less than 100 Pa and at a temperature being from more than decarbonizing to less than powder sintering.

(3) The process for producing a synthetic quartz powder according to above-mentioned (2), wherein the baking atmosphere is a dry air or an oxidizing atmosphere, the baking temperature is more than 800° C. to less than 1400° C., and a baking time is 5 to 70 hours.

(4) The process for producing a synthetic quartz powder according to above-mentioned (1) to (2), wherein the low pressure is less than 50 Pa and the baking temperature is more than 600° C. to less than 1400° C.

(5) The process for producing a synthetic quartz powder according to above-mentioned (1) to (2), wherein the baking time in the low pressure atmosphere is defined by the time required to reach a specified low pressure.

(6) The process for producing a synthetic quartz powder according to above-mentioned (5), wherein the baking in the low pressure atmosphere is finished when the pressure decreases to less than 5 Pa.

Moreover, this invention relates to a following synthetic quartz powder and quartz glass crucible.

(7) A synthetic quartz powder made by any processes according to above-mentioned (1) to (2), wherein a carbon content of the powder is less than 2 ppm and a hydroxyl group content is less than 50 ppm.

(8) A quartz glass crucible made by a synthetic quartz powder, wherein at least a part of an inside surface of the crucible is made using the synthetic quartz powder of the above-mentioned (7) as a raw material.

(9) A quartz glass crucible made by a synthetic quartz powder, wherein at least a part of the inside surface of the crucible is made using the synthetic quartz powder of the above-mentioned (7), and a transparent glass layer 0.5 mm thick forming the inside surface of the crucible has a bubble content of less than 0.1%.

The process for producing of this invention reduces residual gases in the powder, especially the residual carbon, by baking the silica gel powder made by a wet process, or the synthetic quartz powder made by baking the silica gel powder, while keeping the state of the powder under the following conditions. The reduced pressure is lower than a medium vacuum, that is, the reduced pressure is less than 100 Pa, and is preferably to less than 50 Pa. The temperature is from more than a decarbonizing temperature to less than a powder sintering temperature, that is, specifically, for example, more than 600° C. to less than 1400° C. In addition, according to the process of this invention, an amorphous synthetic quartz powder having a residual carbon content of less than 2 ppm can be produced.

In addition, the process for producing of this invention also includes the process that bakes to decarbonize in the above-mentioned vacuum, after baking to remove the hydroxyl group in an air atmosphere while keeping the powder state. By baking in two stages in an air atmosphere and a low pressure atmosphere at the specific temperature range, the amorphous synthetic quartz powder, which is remarkably reduced in residual hydroxyl groups and residual carbon, is made. Specifically, in the above-mentioned synthetic quartz powder, the residual carbon is less than 2 ppm, and the residual hydroxyl group is less than 50 ppm.

DETAILED DESCRIPTION OF PREFERRED EMBODIMENTS

Hereafter, preferred embodiments of the invention are explained in detail with reference to examples.

The process for producing the synthetic quartz powder of this invention is that the silica gel powder or the synthetic quartz powder made by a wet process is baked in the low pressure atmosphere of less than 100 Pa and at a temperature being from more than decarbonizing to less than powder sintering. Moreover, the synthetic quartz powder of this process is made by baking the silica gel powder made by a wet process in an air atmosphere and at a temperature being from more than that removing the hydroxyl group to less than that sintering powder, and said synthetic quartz powder is baked in the low pressure atmosphere of less than 100 Pa and at the temperature being from more than that decarbonizing to less than that sintering powder.

In this invention, the silica gel powder made by a wet process is silica gel powder made by the sol-gel method by hydrolyzing alkoxy-silane etc., and the synthetic quartz powder is made from the silica gel powder. The dry silica gel powder is made by pulverizing and drying the gel, which is made by hydrolyzing alkoxy-silane etc. Moreover, by sintering at the predetermined temperature and drying the silica gel powder, amorphous synthetic quartz powder can be made.

In addition, a humid gel (a wet gel, i.e., an amorphous silicate containing water) is made by hydrolyzing and gelling the alkoxy-silane, such as ethyl-silcate, etc. The humid gel contains alcohols and water in the pores. The dry gel is made by heating the humid gel at 50° C. to 200° C. and drying alcohols and water from the pores. Conventionally, the dry silica gel powder has 1000 ppm to 10000 ppm of residual carbon, and contains 10 to 40 wt % of The conventional process for producing the amorphous synthetic quartz powder is that the residual carbon in the pore is combusted by heating the dry silica gel powder at the predetermined temperature (about less than 600° C.) at which the pores are not closed in air, and after reducing the carbon content to 50–2000 ppm, the silica gel powder is heated and baked at 1000 to 1300° C., where the powder is vitrified and the pores closed.

On the other hand, the process for producing of this invention does not reduce the residual carbon only by combusting the carbon at less than 600° C., but by baking to decarbonize in a reduced pressure less than medium vacuum, i.e., less than 100 Pa, preferably less than 50 Pa, while keeping in the powder state. It is also good that this decarbonization by vacuum baking is done, after the synthetic quartz powder is made by baking the dry silica gel powder to reduce the hydroxyl group in air, while keeping in the powder state. Moreover, it is also good that preliminary baking is done before the air baking, if necessary. In addition, the process for producing of this invention includes the case of the vacuum baking being done after preliminary baking and air baking. Hereafter, the preliminary baking, the air baking, and the vacuum baking are explained in order of the processing.

Preliminary Baking

The dry gel made by hydrolyzing alkoxy-silane contains 1000 ppm–10000 ppm of residual carbon, and contains 10–40 wt % of $H_2O$. By baking the dry silica gel at less than 600° C. in a dry atmosphere having oxygen, the residual carbon is combusted and the residual moisture is evaporated. In the heating method, the dry silica gel can be put into an electric furnace to heat where the furnace is heated beforehand at 500 to 600° C. The heating time is 2 to 50 hours suitably. Moreover, since the combustion of carbon accelerates as the oxygen concentration becomes high, more than 30 vol % of oxygen concentration is suitable, and a dry atmosphere is preferable to accelerate the evaporation of the moisture. By the preliminary baking, the $H_2O$ content can be reduced to 1 to 10 wt %, and the carbon concentration can be reduced to 50 to 2000 ppm. However, since it is difficult to reduce the $H_2O$ content and the carbon concentration less than above-mentioned values under practical conditions, the following air baking and vacuum baking are done.

Air Baking

By baking the silica gel powder in air, the content of the hydroxyl group and the residual carbon is reduced, and the amorphous synthetic quartz powder is made. Since it is better for productivity to do the vacuum baking of the synthetic quartz powder rather than doing vacuum baking of the silica gel powder directly, it is preferable to do the air baking. The baking of the silica gel powder in air is done at a temperature being from more than that removing hydroxyl groups to less than that sintering powder, while keeping the powder state. Here, the removing hydroxyl group temperature is the temperature that the hydroxyl group contained in the silica gel powder removes away, specifically, is more than 800° C. in general, and preferably more than 1000° C. Moreover, the powder sintering temperature is the temperature that keeps the powder state before the powder is fused to become a block. In addition, the temperature producing partial sintering, where the baked powder can be pulverized, is included in the range of the temperature being less than the powder sintering. Specifically, the temperature being less than the powder sintering is less than 1400° C. in general, and preferably less than 1300° C. Although the baking time depends on the temperature, it is enough to be 5 to 70 hours.

The temperature-rising speed in the air baking is preferably 1 to 10° C./minute, both in the case of doing the air baking from the preliminary baking continuously and in the case of doing the preliminary baking and air baking independently. It is not preferable that the temperature-rising speed be higher than the above-mentioned value, since the carbon and the hydroxyl group included in the powder are gasified rapidly to splash the powder.

Both an air atmosphere and an oxidizing atmosphere are suitable for the baking atmosphere of the air baking. In the case of baking in the oxidizing atmosphere, since the combustion of carbon is accelerated as the oxygen concentration becomes high, such condition is preferable. Specifically, more than 30 vol % of the oxygen concentration is suitable. Moreover, the dry atmosphere is preferable in order to accelerate the evaporation of moisture. Specifically, a low humidity atmosphere is suitable, in which the dew point is less than −30° C. and preferably less than −50° C.

By the above-mentioned air baking, the hydroxyl group contained in silica gel powder is removed away, and the hydroxyl group concentration decreases to 50 to 100 ppm. Moreover, the contained carbon is also combusted simultaneously and the carbon concentration decreases to 5 to 20 ppm. However, in general, it is difficult to reduce the residual carbon to less than above-mentioned level by the air baking. Therefore, in the process for producing of this invention, the residual carbon can be reduced remarkably by the vacuum baking after the air baking. In addition, the hydroxyl group concentration is also reduced by the vacuum baking. The vacuum baking can be done immediately after the air baking or independently from the air baking.

Vacuum Baking

The decarbonizing baking in a low pressure atmosphere is done in less than 100 Pa and at a temperature being from more than that for decarbonizing to less than that for powder sintering. The decarbonizing temperature is the temperature at which the carbon is gasified and removed away from the silica gel powder or the synthetic quartz powder, and although is changed with vacuum degree, is more than 600° C. in general, and preferably more than 800° C. Moreover, as above-mentioned, the powder sintering temperature is less than 1400° C. in general, and preferably less than 1300° C. When the baking temperature is less than 600° C., the residual carbon cannot be removed enough. On the other hand, when the baking temperature is more than 1400° C., the raw material powder (the silica gel powder or the synthetic quartz powder) is sintered to each other to become a block and the specific surface area becomes small, so that the decarbonization can not proceed. When the raw material powder is baked while keeping the powder state, it is suitable to be less than 1400° C. In addition, when the baking temperature becomes more than 1200° C., the sintering of the raw material powder is started partially, so that the sintered powder must be crushed after the process of the vacuum baking. Therefore, the process becomes costly and is not preferable. From this reason, the baking temperature is preferably from 800 to 1200° C. Moreover, the baking time is suitably more than 1 hour, and preferably 2 to 24 hours. When the baking time is less than 1 hour, the decarbonization is insufficient.

The baking is done in a higher vacuum than medium vacuum (in the vacuum of low pressure). Conventionally, the vacuum degree is classified to three classes with the pressure, i.e., low vacuum (an atmospheric pressure to 100 Pa), medium vacuum (100 Pa to 0.1 Pa), high vacuum (0.1 Pa to $10^{-5}$ Pa), and ultra high vacuum (less than $10^{-5}$ Pa). However, the baking of this invention is done in a vacuum higher than medium vacuum, i.e., in the medium vacuum less than 100 Pa, and the high vacuum less than 0.1 Pa. There is not enough decarbonizing effect in the low vacuum more than 100 Pa. The vacuum degree is preferably to be less than 50 Pa. The residual carbon can be reduced in a short time as the vacuum degree becomes high. An evacuating method is not limited.

By baking the raw material powder in the vacuum higher than the medium vacuum less than 100 Pa, the carbon groups intermixed or included in the raw material powder, or the carbon groups adsorbed on the surface of the raw material powder, are decomposed to be gasified and removed. Conventionally, the carbon contained in the silica gel powder or the synthetic quartz powder exists with the following various forms: (a) carbon taken in inside of the quartz powder, (b) carbon adsorbed on the surface of the powder, and (c) carbon intermixed between powders. By the preliminary baking and the air baking, although the carbons of above mentioned (b) and (c) can be removed, the carbon of above mentioned (a) cannot be removed enough. For this reason, it is difficult to reduce the residual carbon less than 5 ppm by the air baking. On the other hand, by the vacuum baking, the carbon of above mentioned (a), (b), and (c) can be removed away, especially, the carbon taken in inside of quartz powder can be removed. Therefore, the residual carbon of quartz powder can be reduced to less than 2 ppm. Moreover, since residual hydroxyl group is also gasified and removed simultaneously, the amount of hydroxyl group content can be less than 50 ppm.

Although either pressure reduction or the heating can be done first at the time of the baking, when the heating is done simultaneously with the pressure reduction or after the pressure reduction is started, the vacuum degree is high at the time of reaching to the predetermined temperature and more decarbonization can be done in a short time, so that it is economical. Specifically, for example, the inside of furnace is evacuated to 10 Pa, and the heating is started to raise the temperature for 8 hours to 1100° C. from room temperature (about 25° C.). After keeping at the fixed temperature of 1100° C. for 10 hours, cooling is done. In this time, when the temperature-rising speed is too high, the carbon and the hydroxyl group contained in the powder gasify rapidly to splash the powder, so that the temperature-rising speed is preferably to be 1 to 10° C./minute, as considering the balance with the processing time.

The vacuum baking can be ended after an objective vacuum is reached. That is, for a while from the baking start, the pressure inside of the furnace is raised by the expansion of residual air in the heating furnace and the evaporation of the residual carbon and the hydroxyl groups in the raw material powder. However, since these gases are removed as time passes, after passing over a peak the pressure inside of the furnace decreases for a short time comparatively, and then, decreases gradually. Specifically, for example, when the baking is done by heating at 1000° C. to 1100° C. in the reduced pressure of 50 Pa, although the pressure first rises, the pressure becomes about 10 Pa in a short time (about 2 hours), and then, decreases gradually to reach less than 5 Pa after about 3 to 7 hours. Preferably the baking is ended after reaching the objective vacuum.

Conventionally, when the baking is ended after reaching a pressure of less than 5 Pa, the amount of the residual carbon in the synthetic quartz powder can be reduced to less than 2 ppm and the hydroxyl group concentration can be reduced to less than 50 ppm. In addition, when the baking is ended after reaching a pressure of less than 1.5 Pa, the amount of the residual carbon of the synthetic quartz powder can be reduced to less than 0.5 ppm and the hydroxyl group concentration can be reduced to less than 30 ppm. Therefore, preferably the baking is ended after reaching a pressure of less than 5 Pa, more preferably less than 1.5 Pa.

Although the vacuum baking can be done directly to the dry silica gel powder which is not air baked, the dry silica gel has low mass density and easily fills the vacuum heating furnace, so its productivity is low. Therefore, when the synthetic quartz powder having high density made by the air baking is used rather than using the dry silica gel, the amount of filling the vacuum heating furnace increases, and the productivity also is improved. Moreover, when the air baking is done, the removal efficiency of the hydroxyl group is good.

As above-mentioned, the process for producing of this invention is the process, which gasifies and removes the residual carbon contained in raw material powder by baking the powder in the low pressure atmosphere. Therefore, this process is not the conventional process, in which the residual carbon is removed by combusting at the temperature of less than 600° C. in the oxygen atmosphere. That is, the process for producing of this invention gasifies and removes the residual carbon from the raw material powder of the dry silica gel powder or the amorphous synthetic quartz powder, by heating said powder in the low pressure atmosphere of less than 100 Pa, preferably less than 50 Pa at the temperature of 600 to 1400° C., while keeping the powder state. Therefore, the process for producing of this invention is different from the process that combusts the residual carbon in oxygen atmosphere. In addition, the process of this invention bakes the raw material powder while keeping the powder state, because the residual carbon is difficult to be removed when the raw material powder is sintered. Moreover, the most of the residual hydroxyl group is gasified to be removed with the residual carbon by this vacuum baking.

By using the process for producing of this invention, amorphous synthetic quartz powder, where the carbon content is less than 2 ppm and hydroxyl group content is less than 50 ppm, can be obtained. When synthetic quartz powder having many residual carbons is used as the raw material of the quartz crucible, the residual carbon is decomposed and gasified to make bubbles under the high temperature at the time of the heating fusion of the quartz powder, so that the product has many bubbles. When said bubbles exist in the silica glass crucible used for raising the a silicon single crystal, such bubbles expand under high temperature at the time of using, and at last burst to make concave parts, so that the growth of the single crystal is prevented.

On the other hand, regarding the synthetic quartz powder of this invention, the carbon content is less than 2 ppm and the amount of hydroxyl groups is less than 50 ppm, which is much fewer than the conventional synthetic quartz powder, so that a quartz glass crucible having few bubbles can be made by using the synthetic quartz powder for the raw material. Specifically, for example, by forming an outside surface layer of the crucible by the natural quartz powder, and using the synthetic quartz powder of this invention as the raw material powder to make an inside surface layer of the crucible, a quartz glass crucible can be made in which the carbon content of the inside surface layer is less than 2 ppm. Moreover, by the above-mentioned method, a quartz glass crucible can be made with a transparent glass inner layer that, within 0.5 mm of the inside of the crucible, has a bubble content of less than 0.1%. In contrast, the bubble content of the inside surface layer of a silica glass crucible made using conventional synthetic quartz powder as the raw material is about 0.2 to 0.3%. Thus, this invention can reduce the bubble content by more than about 50%.

Moreover, when the quartz glass crucible is made by using the synthetic quartz powder of this invention, the average particle diameter of the synthetic quartz powder is set to the suitable diameter for making of the quartz glass crucible beforehand. For example, it is suitable that, regarding the dry silica gel powder, the diameter is 50 to 1000 $\mu$m and preferably 100 to 600 $\mu$m, and regarding the amorphous synthetic quartz powder, the diameter is 75 to 700 $\mu$m and preferably 100 to 500 $\mu$m. As for the particle having the above-mentioned particle diameter, the decarbonization reaction easily accelerates at the time of heat-treating in the vacuum of more than the medium vacuum.

Conventionally, the quartz glass crucible made using the synthetic quartz powder as the raw material has more bubbles than the crucible made by the natural quartz powder, because many gas components (OH group and carbon) are contained in the synthetic quartz powder compared with the natural quartz powder. Although the gas components become the sources of generating bubbles, there are expanding bubbles and disappearing bubbles without expanding, at the time of using the crucible. The components of the expanding bubbles are mainly CO and $CO_2$, and the main components of the bubbles that do not expand so much are moisture ($H_2O$). Therefore, the amount of carbon contained in the raw material powder of the quartz glass crucible has much influence on the quality of the crucible.

According to the process of this invention, since the amount of the residual carbon can be remarkably reduced by the dry silica gel powder and the amorphous synthetic quartz powder as above-mentioned, quartz glass crucibles having quite few bubbles can be made by using these powders as the raw material. Moreover, regarding not only the quartz glass crucible, but also other silica glass products made by the synthetic quartz powder as the raw material, products having few bubbles and low carbon contents can be made.

EXAMPLES

The invention will be explained more concretely with the following examples.

Example 1 and Comparison Example 1

The vacuum baking of the amorphous synthetic quartz powder obtained by hydrolyzing alkoxy-silane was done under the conditions shown in Table 1. In addition, since the pressure of the inside of the vacuum furnace is raised with the gases generated by baking, the baking was done while evacuating suitably the inside to keep the predetermined vacuum degree. The amount of the residual carbon by this vacuum baking is shown in Table 1. Moreover, a quartz glass crucible was made by using the baked synthetic quartz powder as the part of the raw material. That is, by the rotational molding method, a quartz glass crucible (24 inches diameter) was made, in which the natural quartz powder was used for the outside part, and the synthetic quartz powder shown in Table 1 was used for the inside part, and in addition, the layer thickness of 2 to 3 mm from the inside surface (the inside surface layer of the crucible) was made with the synthetic quartz layer, and the outside of the layer (the outside surface layer of the crucible) was made with the natural quartz layer (the layer thickness of 10–12 mm). Regarding this quartz glass crucible, the bubble content and carbon concentration at a part of 0.5 mm from the inside surface were measured. Moreover, the silicon single crystal was raised by using these crucibles. This result (the average value of five) was summarized in Table 1.

As shown in Table 1, the synthetic quartz powder made by baking process of this invention (Example: No. A1 to No. A4) has very few amounts of the residual carbon. Therefore, there were also few bubbles content of quartz glass crucible, and the excellent rate of single-crystalizing is realized. In addition, as for these sample No. A1 to No. A4, when the synthetic quartz powder was put into the glass crucible to be covered with a cap, and the crucible was put in the vacuum heating chamber for the baking process, then the carbon has adhered to the reverse side of the cap after baking, so that it could be also checked visually that the carbon, which is equivalent to the amount of adhesion at least, had moved away from the quartz powder of the raw material (decarbonization).

On the other hand, in the comparison example (No. B1 to No. B3) which was out of the conditions of the baking process of this invention, the carbon was not adhered to the reverse side of the cap, and large amounts of the residual carbon were measured by analyzing the quartz powder after baking processing. For this reason, the bubble content of the quartz glass crucible made with this quartz powder was 2 to 5 times that of the crucible of this invention, and the rate of single-crystalizing was as low as about 50% of this inventions. Moreover, as for the comparison example No. B4, the raw material powder sintered to a block, so that the quartz crucible could not be made.

Example 2 and Comparison Example 2

By baking 100 kg of silica gel powder made by hydrolyzing alkoxy-silane (the amount of the residual carbon is 93 ppm, $H_2O$ content is 40 wt %) under the conditions shown in Table 2, amorphous synthetic quartz powder was made. In addition, the vacuum baking of this example is different from the Example 1, which was baked while keeping the predetermined vacuum degree. The vacuum baking of this example is baked under the vacuum of less than 50 Pa, is continued while always evacuating the gas generated by baking, and is ended after reaching the objective vacuum degree. The result of this baking process was shown in Table 2 with the reached vacuum degree. Furthermore, the quartz glass crucible was made like the Example 1 by using the synthetic quartz powder after a baking process as a part of the raw material. Regarding this quartz crucible, the bubble content of the part 0.5 mm from the inside surface and the carbon concentration are shown in Table 2. Moreover, the bubble content after using the crucible for raising the silicon single crystal was shown in Table 2.

For each synthetic quartz powder (No. A21–No. A27) of this invention after the vacuum baking, the amount of residual carbon is less than 2 ppm, and the amount of residual hydroxyl group is less than 50 ppm, which is remarkably small. Moreover, there are also very few bubbles in the quartz crucibles made. On the other hand, since the comparison sample No. B21 was done at too high a temperature for the air baking, most of the silica gel powder sintered, so the objective synthetic quartz powder could not be obtained. Moreover, since the comparison sample No. B22 was done at too high a temperature for the vacuum baking, most of the powder sintered. In addition, since the comparison sample No. B23 was done at too low temperature of the vacuum baking, the decarbonization and drying in the vacuum baking hardly proceeded, and the amount of the residual carbon and the residual hydroxyl group hardly changed at the time of the air baking. Furthermore, since the comparison sample No. B24 was done at a low temperature of the air baking, the temperature-rising speed was high at the time of the subsequent vacuum baking, so that gases generated rapidly to splash the raw material powder. Moreover, since the comparison sample No. B25 and No. B26, were done under low vacuum, there were very large amounts of residual carbon and residual hydroxyl groups after baking. From this reason, the bubble content of the resulting quartz crucible was high, and in the comparison sample No,. B26 a lot of bubbles were generated, so that the sample was not suitable for practical use.

The disclosure of the priority document, Japanese Application No. 2000-195167 filed Jun. 28, 2000, is incorporated by reference herein in its entirety.

TABLE 1

|  | Example 1 | | | | Comparison Example 1 | | | |
| --- | --- | --- | --- | --- | --- | --- | --- | --- |
|  | A1 | A2 | A3 | A4 | B1 | B2 | B3 | B4 |
| Residual Carbon content (Before Treatment: ppm) | 15.7 | 15.7 | 15.7 | 15.7 | 15.7 | 15.7 | 15.7 | 15.7 |
| Vacuum Baking |  |  |  |  |  |  |  |  |
| Maximum Temperature (° C.) | 1150 | 1000 | 750 | 650 | Non Treatment | 500 | 1150 | 1500 |
| Heating Time (hr) | 4 | 10 | 18 | 24 | — | 24 | 4 | 2 |
| Vacuum Degree (Pa) | 10 | 10 | 10 | 70 | — | 70 | 200 | 100 |
| Carbon Content (ppm) | 0.4 | 1.00 | 1.5 | 1.9 | 15.7 | 10.1 | 8.7 |  |
| Quartz Crucible |  |  |  |  |  |  |  |  |
| Carbon content (ppm) | 0.4 | 1.00 | 1.5 | 1.9 | 15.7 | 10.1 | 8.7 | Raw Material |
| Rate of Bubble Content (Before Use: %) | 0.03 | 0.06 | 0.08 | 0.09 | 0.27 | 0.20 | 0.21 | Powder was |
| Rate of Bubble Content (After Use: %) | 1.2 | 3.4 | 4.4 | 5.7 | 19.3 | 14.3 | 13.4 | Sintered like |

TABLE 1-continued

|  | Example 1 | | | | Comparison Example 1 | | | |
| --- | --- | --- | --- | --- | --- | --- | --- | --- |
|  | A1 | A2 | A3 | A4 | B1 | B2 | B3 | B4 |
| Rate of Single-Crystalizing (%) | 77 | 74 | 70 | 68 | 33 | 45 | 46 | a Block. |
| Judgement | ◎ | ○ | ○ | ○ | X | X | X | X |

Notes

The column of Quartz Crucible is the value of the inside surface layer formed with the synthetic quartz.

Judgement is that ◎ is Best, ○ is Good, and X is No Good.

Heating Time is the heating time at the maximum temperature.

Rate of Bubble Content is the value of the layer have 0.5 mm thickness from the inside surface of the crucible.

Rate of Single-Crystalizing is weight of single crystal/weight of raw material poly-crystal (%)

Unit of Rate of Bubble content and Rate of Single-crystalizing is %.

TABLE 2

|  | Example 1 | | | | | | |
| --- | --- | --- | --- | --- | --- | --- | --- |
|  | A21 | A22 | A23 | A24 | A25 | A26 | A27 |
| Air Baking | | | | | | | |
| Maximum Temperature (° C.) | 1300 | 1300 | 1200 | 1200 | 800 | 1000 | 1000 |
| Heating Time (hr) | 36 | 36 | 60 | 48 | 70 | 15 | 15 |
| After Air Baking | | | | | | | |
| Carbon Concentration (ppm) | 7.7 | 7.7 | 13.7 | 16.1 | 47.4 | 320 | 320 |
| Hydroxyl group concentration (ppm) | 54 | 54 | 61 | 69 | 1430 | 970 | 970 |
| Vacuum Baking | | | | | | | |
| Maximum Temperature (° C.) | 1300 | 600 | 1200 | 1150 | 1200 | 1150 | 1150 |
| Heating Time (hr) | 2 | 80 | 24 | 12 | 36 | 48 | 24 |
| Reached Vacuum Degree (Pa) | 4.8 | 4.6 | 0.9 | 1.4 | 4.1 | 1.2 | 5.0 |
| After Vacuum Baking | | | | | | | |
| Carbon Concentration (ppm) | 1.8 | 1.6 | 0.3 | 0.5 | 1.2 | 0.4 | 1.8 |
| Hydroxyl group concentration (ppm) | 48 | 44 | 23 | 30 | 40 | 26 | 47 |
| Quartz Crucible | | | | | | | |
| Carbon concentration (ppm) | 1.8 | 1.6 | 0.3 | 0.5 | 1.2 | 0.4 | 1.8 |
| Rate of Bubble Content (Before Use: %) | 0.09 | 0.08 | 0.02 | 0.05 | 0.08 | 0.03 | 0.09 |
| Rate of Bubble Content (After Use: %) | 5.5 | 4.3 | 1.0 | 3.2 | 4.3 | 1.4 | 5.3 |
| Rate of Single-Crystalizing (%) | 66 | 70 | 77 | 73 | 70 | 77 | 68 |
| Judgement | ○ | ○ | ◎ | ○ | ○ | ◎ | ○ |

|  | Comparison Example 1 | | | | | |
| --- | --- | --- | --- | --- | --- | --- |
|  | B21 | B22 | B23 | B24 | B25 | B26 |
| Air Baking | | | | | | |
| Maximum Temperature (° C.) | 1450 | 1200 | 1200 | 500 | 1000 | 1000 |
| Heating Time (hr) | 5 | 60 | 60 | 120 | 15 | 15 |
| After Air Baking | | | | | | |
| Carbon Concentration (ppm) | Almost raw material powder was sintered in the Air Baking | 13.7 | 13.7 | 0.2 wt % | 320 | 320 |
| Hydroxyl group concentration (ppm) | | 61 | 61 | 9.2 wt % | 970 | 970 |
| Vacuum Baking | | | | | | |
| Maximum Temperature (° C.) | | 1450 | 550 | While heating up to 800° C. gases were generated suddenly and the raw material powder was splashed | 1150 | 1150 |
| Heating Time (hr) | | 8 | 100 | | 12 | 6 |
| Reached Vacuum Degree (Pa) | | 24 | 0.6 | | 15 | 37 |
| After Vacuum Baking | | 9.4 | | | 18.4 | 43.3 |
| Carbon Concentration (ppm) | | | 13.7 | | | |
| Hydroxyl group concentration (ppm) | | 51 | 61 | | 71 | 155 |
| Quartz Crucible | | Almost raw material powder was | | | | Many bubbles were |
| Carbon concentration (ppm) | | | 13.7 | | 18.4 | |
| Rate of Bubble Content (Before Use: %) | | | 0.24 | | 0.35 | |

TABLE 2-continued

| | | | | | | |
|---|---|---|---|---|---|---|
| Rate of Bubble Content (After Use: %) | | sintered in the Vacuum Baking | 22.4 | | 24.1 | generated. |
| Rate of Single-Crystalizing (%) | | | 40 | | 30 | |
| Judgement | X | X | X | X | X | X |

Notes:
The column of Quartz Crucible is the value of the inside surface layer formed with the synthetic quartz.
Judgement is that ⊚ is Best, ○ is Good, and X is No Good.
Heating Time is the heating time at the maximum temperature.
Rate of Bubble Content is the value of the layer have 0.5 mm thickness from the inside surface of the crucible.
Rate of Single-Crystalizing is weight of single crystal/weight of raw material poly-crystal (%)
Unit of Rate of Bubble content and Rate of Single-crystalizing is %.
Residual Carbon concentration of the raw silica gel powder at before treatment is 9340 ppm and H$_2$O content is 40 wt %.

What is claimed is:

1. A process for producing a high purity synthetic quartz powder, the process comprising baking a silica gel powder, made by a wet process, to form a synthetic quartz powder, where the baking is at atmospheric pressure and at a temperature in a range higher than a temperature at which hydroxyl groups are removed from the silica gel powder and lower than a temperature at which the silica gel powder sinters; and baking the synthetic quartz powder under a low pressure atmosphere simultaneously within a pressure range of from 0 Pa to less than 100 Pa and at a baking temperature, T, in a range of 600° C.<T<1400° C., wherein the baking at atmospheric pressure is in dry air or an oxidizing atmosphere;

the baking temperature during the baking at atmospheric pressure is in a range from more than 800° C. to less than 1400° C.; and the synthetic quartz powder is baked at atmospheric pressure for a baking me of 5 to 70 hours.

2. The process according to claim 1, wherein the low pressure atmosphere is at a pressure of less than 50 Pa.

3. The process according to claim 1, wherein the baking under the low pressure atmosphere is finished when the low pressure atmosphere reaches a preselected pressure.

4. The process according to claim 3, wherein the preselected pressure is less than 5 Pa.

5. The process according to claim 1, wherein the baking under the low pressure atmosphere forms a synthetic quartz powder having a carbon content of less than 2 ppm.

6. The process according to claim 1, wherein the baking under the low pressure atmosphere forms a synthetic quartz powder having a hydroxyl group content of less than 50 ppm.

* * * * *